US005706107A

United States Patent [19]

Smith

[11] Patent Number: 5,706,107
[45] Date of Patent: Jan. 6, 1998

[54] WINDSHIELD GRATING HOLOGRAM FOR INCREASING BUS DRIVER'S FIELD OF VIEW

[75] Inventor: Ronald T. Smith, Corona Del Mar, Calif.

[73] Assignee: Hughes Electronics, Los Angeles, Calif.

[21] Appl. No.: 584,670

[22] Filed: Jan. 11, 1996

[51] Int. Cl.$^6$ .................................................. G02B 5/32
[52] U.S. Cl. ..................... 359/15; 359/1; 359/13; 296/96.12
[58] Field of Search ........................... 359/1, 13, 14, 359/15, 19, 567, 630; 296/96.12

[56] References Cited

U.S. PATENT DOCUMENTS 3,737,212  6/1973  Antonson et al. .................... 359/14
4,261,635  4/1981  Freeman ............................. 359/13

*Primary Examiner*—Thong Nguyen
*Assistant Examiner*—Darren E. Schuberg
*Attorney, Agent, or Firm*—Leonard A. Alkov; Wanda K. Denson-Low

[57] ABSTRACT

A holographic viewing apparatus for allowing an operator of a bus to view a portion of a blind spot region located in front of the bus and below the windshield of the bus. The holographic viewing apparatus includes a volume transmission holographic grating attached to a lower edge of the windshield of the bus for transmissively diffracting light from a portion of the blind spot region such that an operator of the bus sees an image of the portion of the blind spot region superimposed on a scene that is directly and non-diffractingly observed through the holographic transmission grating.

3 Claims, 1 Drawing Sheet

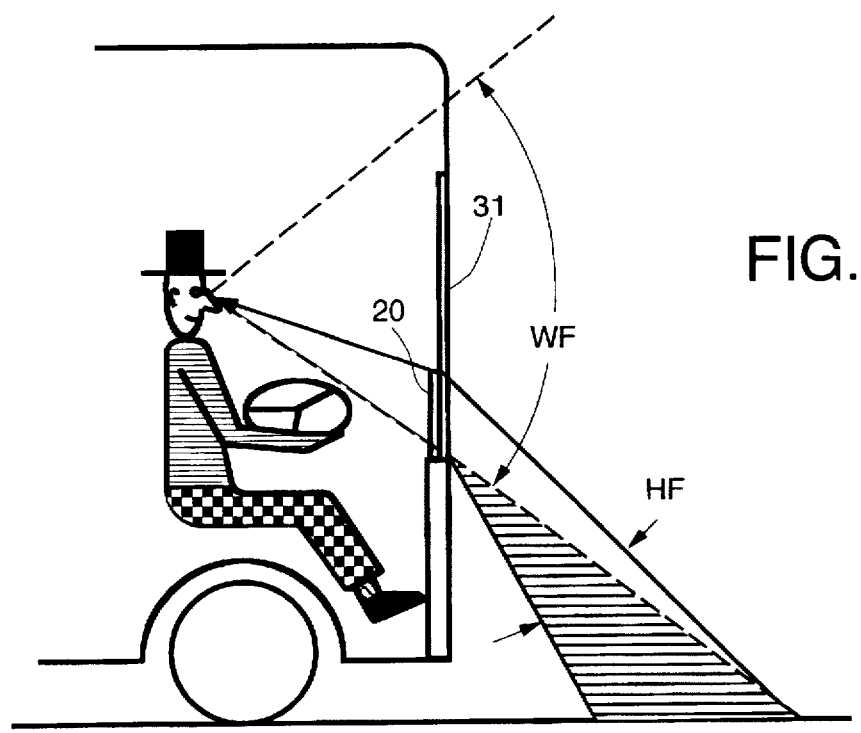
FIG. 1.
FIG. 2.
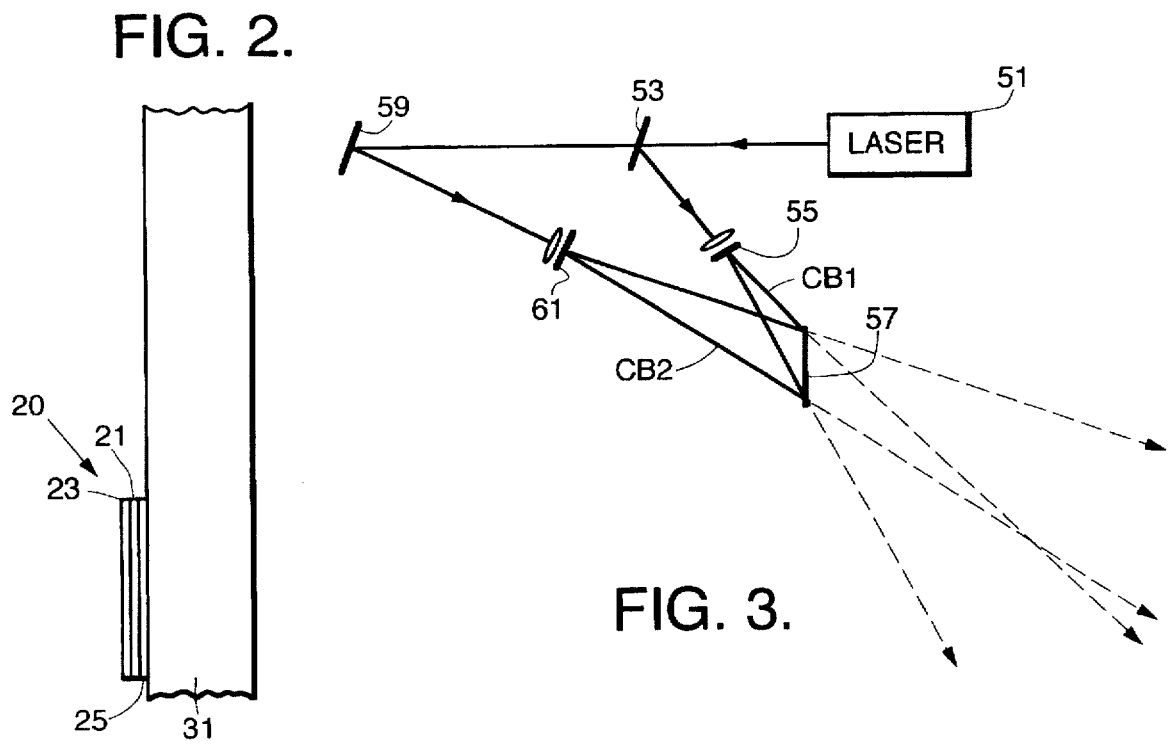
FIG. 3.

5,706,107

1

WINDSHIELD GRATING HOLOGRAM FOR INCREASING BUS DRIVER'S FIELD OF VIEW

BACKGROUND OF THE INVENTION

The disclosed invention is directed generally to vehicle mounted operator viewing apparatus, and more particularly to holographic viewing apparatus for enabling an operator of a vehicle to view a portion of a blind spot region in front of a vehicle that is not readily directly observable by the operator of the vehicle.

In current buses, there is blind spot region located near the ground in front of a bus that is caused by the fact that the windshield of the bus does not extend to the bottom of the bus. This blind spot region cannot be directly observed by the bus driver when seated in the driver's seat, and thus is potentially dangerous since small children could be in front of the bus and hidden from the direct view of bus driver.

The problem of the blind spot region located near the ground in front of a bus is presently addressed by use of a convex spherical mirror that is attached to the front left or right side of the bus, which allows a bus driver to see at least a portion of the blind spot region. Considerations with the use of a convex spherical mirror include the significantly reduced size of the image, the location of the mirror away from the driver's generally forward focus of attention, and the need to associate the image in the mirror to the blind spot region. Moreover, the mirror protrudes from the side and front of the bus which decreases aerodynamic efficiency and is subject to damage if the bus passes too close to an object such as a building, road sign or another bus.

SUMMARY OF THE INVENTION

It would therefore be an advantage to provide apparatus that allows a bus driver to easily observe a portion of blind spot region located in front of a bus while viewing the directly observable scene in front of the bus.

Another advantage would be to provide apparatus that allows a bus driver to easily observe a portion of a blind spot region located in front of a bus and which does not require structure that protrudes from the bus.

The foregoing and other advantages are provided by the invention in a holographic viewing apparatus that comprises a holographic transmission grating attached to a lower edge of a windshield disposed in a vehicle for transmissively diffracting light from a portion of a blind spot region that is in front of the vehicle and below the windshield of the vehicle, whereby the operator of the vehicle sees an image of the portion of the blind spot region superimposed on a scene that is directly and non-diffractingly observed through the holographic transmission grating.

BRIEF DESCRIPTION OF THE DRAWINGS

The advantages and features of the disclosed invention will readily be appreciated by persons skilled in the art from the following detailed description when read in conjunction with the drawing wherein:

FIG. 1 is a schematic side elevational view of the holographic viewing apparatus of the invention.

FIG. 2 is a schematic side elevational view of the hologram grating decal of the holographic viewing apparatus of FIG. 1.

FIG. 3 schematically illustrates an illustrative example of an exposure setup for constructing the volume transmission hologram grating layer of FIG. 2.

2

DETAILED DESCRIPTION OF THE DISCLOSURE

In the following detailed description and in the several figures of the drawing, like elements are identified with like reference numerals.

Referring now to FIG. 1, set forth therein is a schematic elevational view of a holographic viewing apparatus in accordance with the invention which includes a holographic transmission grating decal 20 that is laminarly attached to the inside surface of a transparent windshield 31 of a bus along the lower edge of the windshield 31. As shown in FIG. 2, the holographic transmission grating decal 20 is comprised for example of a volume transmission hologram grating layer 21 disposed between a transparent outer protective plastic layer 23 and a transparent adhesive layer 25 that is attached to the inside surface of the windshield 31.

In accordance with the invention, the volume transmission hologram grating layer 21 is configured to diffract a portion of the light from a hologram vertical angular field HF that includes a portion of the blind spot region that is in front of the bus and generally below a field of view WF provided by the windshield 31.

The volume transmission hologram grating layer 21 is partially transparent and angularly selective, and thus a portion of the light from the scene that is within the vertical angle formed by lines that diverge from driver's eyes and pass through the top and bottom edges of the volume transmission hologram is non-diffractingly transmitted by the volume transmission hologram grating layer 21 such that such scene is directly observable by the bus driver. In other words, the driver can directly non-diffractingly observe through the volume transmission hologram 21 the scene that is contained in the vertical angle formed by two lines that diverge from the driver's eyes and pass through the top and bottom edges of the volume transmission hologram 21. A portion of the light from the hologram vertical angular field HF is diffracted by the transmission hologram grating layer 21 toward the driver's eyes, and an image of the scene in the hologram vertical angular field HF will be superimposed on the scene that is directly non-diffractingly viewed through the transmission hologram grating layer 21.

Referring now to FIG. 3, schematically depicted therein is an illustrative example of an exposure set up for constructing the transmission hologram grating layer 21 of FIG. 2. The exposure system includes a laser 51 that conventionally provides a polarized output which is directed to a beamsplitter 53 that provides a transmitted beam and a reflected beam.

The reflected beam output of the beamsplitter 53 is directed to a spatial filter 55 which produces a spherically diverging first construction beam CB1 that illuminates a hologram recording layer 57. The transmitted beam output of the beamsplitter 53 is directed by a mirror 59 to a spatial filter 61 which produces a spherically diverging second construction beam CB2 that illuminates the hologram recording layer 57. In accordance with conventional hologram exposure procedures, the first construction beam CB1 and the second construction beam CB2 interfere in the holographic recording layer 57 to form holographic fringes therein.

When a hologram formed pursuant to the exposure set up of FIG. 3 is illuminated with a conjugate (or reverse) of the one of the construction beams, a conjugate of the other construction beam is created. Referring in particular the holographic transmission grating decal 20 of FIG. 1, the holographic transmission grating decal 20 of FIG. 1 and the hologram recording layer 57 of FIG. 3 are similarly oriented and it should be appreciated that light within the hologram angular field HF (FIG. 1) provides a conjugate of the first construction beam CB1 which is diffracted to produce a conjugate of the second construction beam CB2 which reaches the bus driver's eyes.

While the foregoing illustrative example of the invention has been directed to a bus windshield application, the invention is more generally directed to a holographic transmission grating for transmissively diffracting light from a region that is angularly displaced from a scene that is directly and non-diffractingly observed through the holographic transmission grating, such that a viewer sees an image of the angularly displaced region superimposed on the scene that is directly and non-diffractingly observed through the holographic transmission grating. As further examples of applications of the invention, the transmission grating can be utilized with vehicle windows, aircraft windscreens and windows, building windows and door windows.

The foregoing has thus been a disclosure of a holographic viewing apparatus that allows a bus driver to easily observe a portion of blind spot region located in front of a bus while viewing the directly observable scene in front of the bus, and which is advantageously laminarly attached to the windshield of the bus.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic viewing apparatus attached to a lower edge of a windshield disposed in a vehicle, the holographic viewing apparatus comprising a holographic transmission grating for transmissively diffracting light from a portion of a blind spot region that is in front of the vehicle and below the windshield of the vehicle, whereby the operator of the vehicle sees an image of the portion of the blind spot region superimposed on a scene that is directly and non-diffractingly observed through the holographic transmission grating.

2. A holographic viewing apparatus comprising:

a transparent windshield of a vehicle;

a partially transparent holographic transmission grating disposed on said transparent windshield for transmissively diffracting light from a portion of a blind spot region that is in front of the windshield and below the windshield which is angularly displaced from a scene that is directly and non-diffractingly observed through the holographic transmission grating, wherein the operator of the vehicle sees an image of the portion of the blind spot region superimposed on said scene that is directly and non-diffractingly observed by the operator of the vehicle through the holographic transmission grating.

3. The holographic viewing apparatus of claim 2 wherein said windshield of a vehicle comprises a windshield of a bus.

* * * * *